United States Patent
Drozny et al.

(10) Patent No.: US 8,071,011 B2
(45) Date of Patent: Dec. 6, 2011

(54) METHOD OF INTRODUCTION OF FILLING MATERIALS IN LIQUID FORM INTO POROUS BODIES

(75) Inventors: Adam Drozny, Kissing (DE); Jürgen Joos, Nellingen (DE); Gregor Stühler, Augsburg (DE)

(73) Assignee: Audi AG, Ingolstadt (DE)

( * ) Notice: Subject to any disclaimer, the term of this patent is extended or adjusted under 35 U.S.C. 154(b) by 570 days.

(21) Appl. No.: 12/210,949

(22) Filed: Sep. 15, 2008

(65) Prior Publication Data
US 2009/0092822 A1 Apr. 9, 2009

(30) Foreign Application Priority Data
Sep. 15, 2007 (DE) .......................... 10 2007 044 122

(51) Int. Cl.
*B32B 3/26* (2006.01)
*C04B 35/565* (2006.01)

(52) U.S. Cl. ..................... 264/682; 428/320.2; 264/257; 264/658; 427/230

(58) Field of Classification Search .................. None
See application file for complete search history.

(56) References Cited

U.S. PATENT DOCUMENTS
4,238,433 A * 12/1980 Hillig et al. .................... 264/257
2005/0244581 A1* 11/2005 Thebault et al. ........... 427/249.2

FOREIGN PATENT DOCUMENTS
| DE | 94 22 458 U1 | 8/2003 |
| DE | 60 2004 003 345 T2 | 6/2007 |
| DE | 10 206 009 388 A1 | 9/2007 |
| EP | 1 346 967 A | 9/2003 |
| EP | 1 860 081 A | 11/2007 |
| EP | 1 876 158 A | 1/2008 |
| FR | 2 851 244 A | 8/2004 |
| GB | 2 243 601 A | 11/1991 |

* cited by examiner

*Primary Examiner* — Ling Xu
(74) *Attorney, Agent, or Firm* — Novak, Druce & Quigg LLP

(57) ABSTRACT

Method for introduction of filling materials into porous bodies in which the filling materials in liquid form are brought into contact with the porous bodies and are distributed from at least one site within the porous body in this porous body.

11 Claims, 5 Drawing Sheets

METHOD OF INTRODUCTION OF FILLING MATERIALS IN LIQUID FORM INTO POROUS BODIES

CROSS-REFERENCE TO RELATED APPLICATIONS

This application claims priority from German Patent Application No. 10 2007 044 122.5 filed on Sep. 15, 2007, the entire disclosures of which are hereby incorporated by reference.

This invention relates to a method for introduction of filling materials in liquid form into porous bodies. In particular, it relates to a method in which the liquid filling materials after introduction into the porous body react with at least one of its components, with the formation of at least one chemical compound.

BACKGROUND OF THE INVENTION

Often in the production of ceramic materials first a porous body is produced by a thermal process step, such as, for example, sintering or pyrolysis, and is then compacted. This compaction can take place by pressing, that is, without adding another substance, or by one or more infiltration or impregnation steps, while the infiltration agent can remain unchanged and at least partially fills only the (open or accessible) pores, or the infiltration agent reacts at least in one part with at least one of the components of the porous body, with the formation of at least one chemical compound.

A field in which this method has acquired technical importance is the production of ceramic material based on silicon carbide, first a porous carbon body being produced which then, by a reaction with liquid silicon or a silicon-containing melt with for the most part preservation of the geometrical shape and dimensions (so-called "near net shape method") of the carbon body, is converted into a body which largely consists of a silicon carbide which has been formed by the reaction of carbon and silicon. At the conventionally used temperatures above the melting point of silicon up to 1700 ° C., the beta-modification of the silicon carbide which is stable at these temperatures is formed.

There are various ways of introducing liquid silicon into porous, carbon-containing bodies. U.S. Pat. No. 5,432,253 discloses placing the porous body which is to be impregnated jointly with silicon in lump form on a carbon cloth (fabric or felt) and heating everything together to the infiltration temperature, that is, a temperature at which the silicon is molten liquid and has a low enough viscosity to penetrate by way of the cloth into the porous body and to be distributed in it.

Another method is known from U.S. Pat. No. 4,626,516 in which a mold with infiltration holes and a reservoir with elementary silicon is used; a porous body is placed in the mold, and the holes are provided with carbon wicks, the wicks being in contact with the porous body and the reservoir. At the operating temperature above the melting point of silicon, the silicon migrates through the wicks into the porous body.

U.S. Pat. No. 4,737,328 discloses covering a porous body with a powder mixture of silicon and boron nitride, and heating the arrangement above the melting point of the silicon, its penetrating into the body, and the boron nitride powder then being brushed off. Another method is covering a porous carbon body with a moldable and hardenable mass of silicon powder and a binder according to patent application WO1982/04248 or patent application EP 0 995 730 A1 . The advantage there is supposed to be that the silicon is delivered exactly in the required amount. Finally, patent application DE 102 12 043 discloses placing the article which is to be infiltrated with silicon on wicks of carbonized wood, these wicks with their lower end dipping into a metal melt.

The problem which is common to all these methods is that the silicon melt is always supplied from the surface of the body to be infiltrated. Here, in the vicinity of the entry point there is always a great excess of silicon, while much less silicon is transported into the regions farther away. For two-dimensional delivery as in applications WO 1982/04248 or EP 0 995 730 A1 . liquid silicon is supplied over the entire covered surface, but a gradient forms over the thickness of the body to be infiltrated. These gradients lead to inhomogeneity in the infiltrated and potentially reacted bodies which occasions an intolerable imbalance, especially for parts turning at high speed, such as brake disks or clutch disks.

SUMMARY OF THE INVENTION

Therefore the object of this invention is to devise a method which leads to symmetrical and largely homogenous distribution of the infiltration agent without the method thereby being complicated in an unacceptable manner.

This object is achieved by supplying the infiltration agent in the interior of the porous body.

Therefore the invention relates to a method for introduction of filling materials into porous bodies in which the filling materials in liquid form are brought into contact with the porous bodies and are distributed in this porous body from at least one site within the porous body. There it is preferred that the filling materials react with at least one component of the porous body with the formation of a chemical compound. Preferably the filling materials are transported into the interior of the porous body by way of at least one wick, and diffuse into the porous body from the end of a wick located in the porous body.

Especially good results are obtained when the filling materials in liquid form are introduced at more than one site within the porous body, the introduction sites preferably being arranged symmetrically. The introduction sites are preferably made as blind holes, in the case of flush-fitting wicks a wick being inserted into a blind hole or in the case of little play between the wick and blind hole the wick being attached in the blind hole by suitable means, for example, by cementing.

Preferably the porous body contains carbon in the form of fibers or fiber bundles or textiles and additional carbon in the form of a porous matrix. The liquid filling material there reacts with the carbon of the porous body at least partially to form carbides. To form ceramic parts with a matrix which contains silicon carbide, the infiltration agent is a silicon-containing melt, the porous body containing carbon. In the process silicon carbide is formed by the reaction of the silicon-containing infiltration agent with the carbon of the porous body. In addition to silicon, other elements such as iron, cobalt, nickel, titanium, boron, aluminum, chromium, manganese, molybdenum, and tungsten can also be contained in the infiltration agent, preferably those which form a homogenous melt with silicon.

In the case of a disk-shaped or ring disk-shaped porous body it is especially preferred that blind holes with a staggered diameter be drilled in these bodies, these blind holes preferably being located centrosymmetrically relative to their location around the axis of rotation of the porous body.

BRIEF DESCRIPTION OF THE DRAWINGS

The invention is explained in the following drawings.

DETAILED DESCRIPTION OF PREFERRED EMBODIMENT OF THE INVENTION

Figure 1:
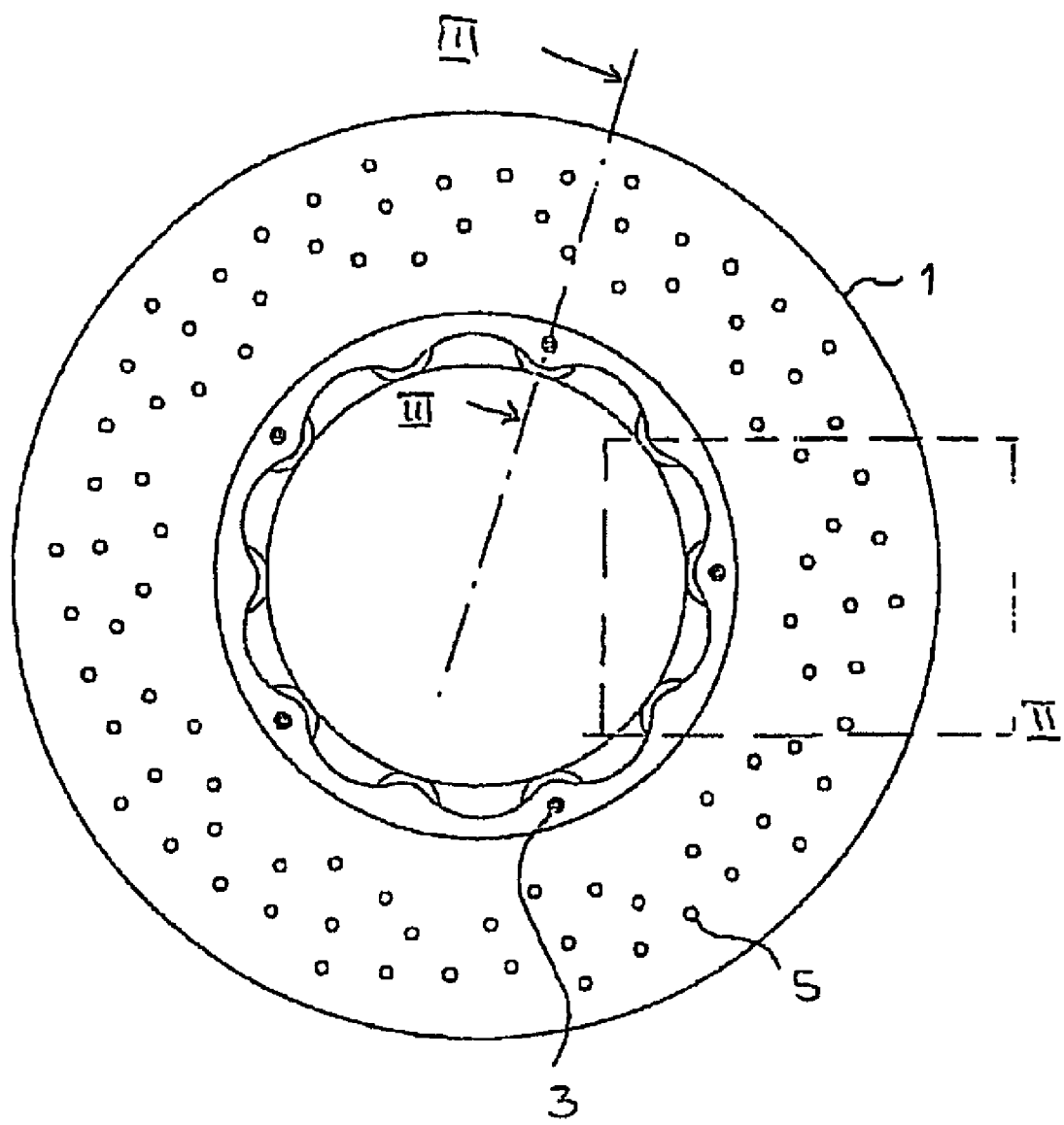
FIG. 1 shows a top view of the lower boundary plane of a ring disk-shaped body for a brake disk with perforation drilled holes.

FIG. 1 shows a top view of a ring disk 1 from the side of the ring disk 1 provided with blind holes 3, in this embodiment five blind holes being located near the inner periphery of the ring disk 1 and each offset by 72°. Perforation drilled holes 5 are distributed over the surface of the ring disk.

Figure 2:
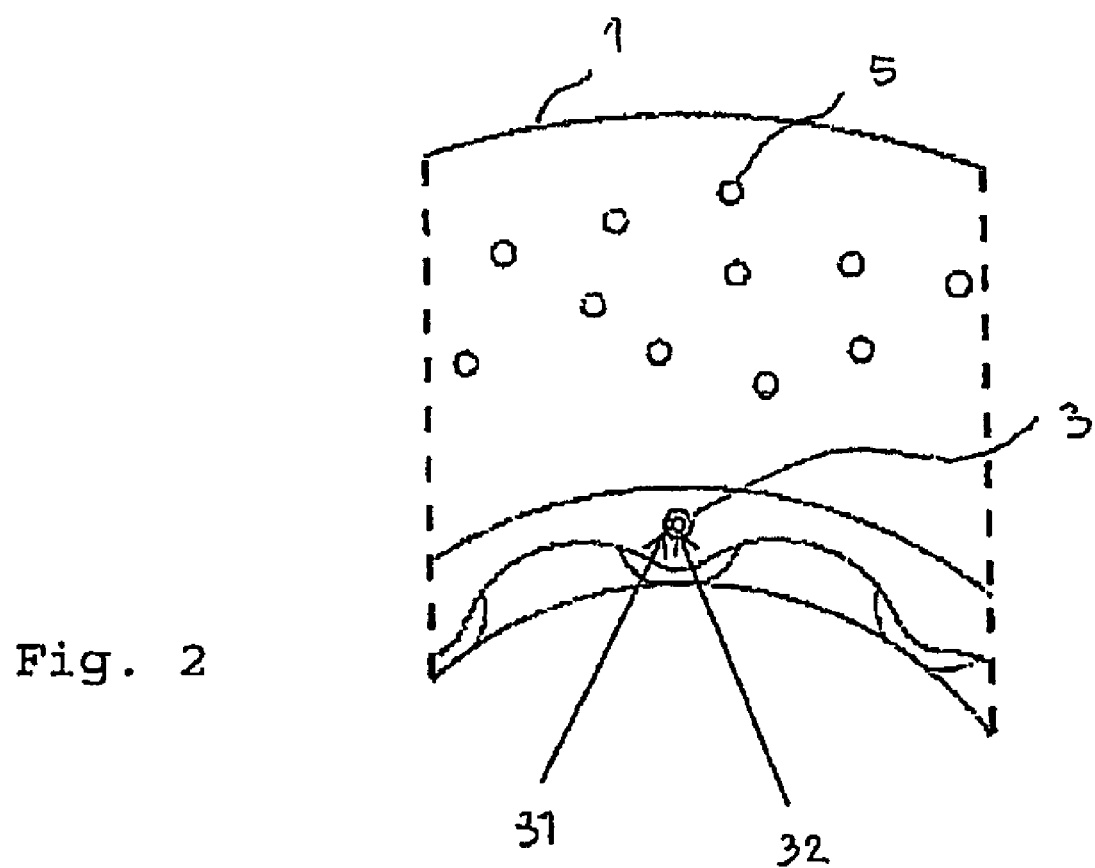
FIG. 2 shows a cutaway view of FIG. 1 in which the staggered shape of the blind hole can be recognized.

FIG. 2 shows a cutaway view of this top view, a blind hole being shown enlarged. Both the drilled hole 31 with the larger diameter and also the drilled hole 32 with the smaller diameter can be recognized from overhead. The perforation drilled holes through the ring disk are designated as 5.

Figure 3:
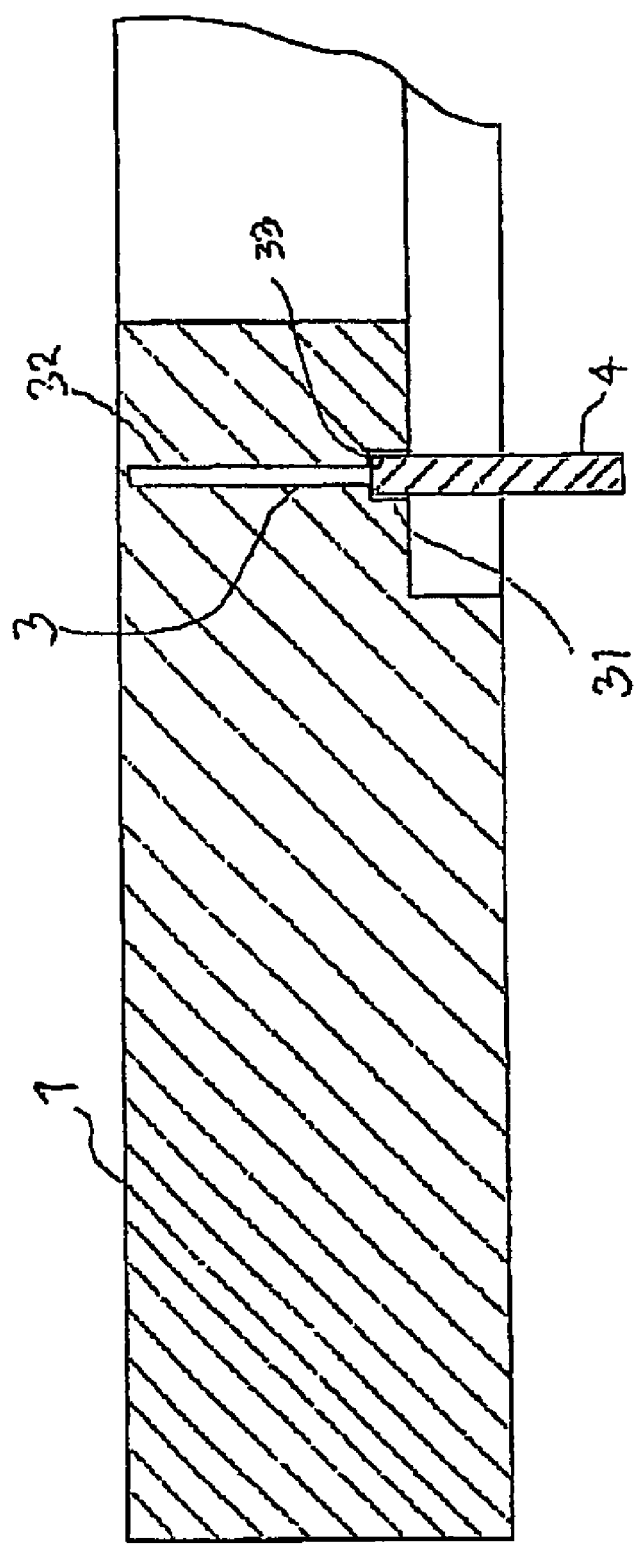
FIG. 3 shows a section through one part of a ring disk-shaped body with a blind hole and an inserted wick.

FIG. 3 shows a section through a ring disk 1 along the plane which is spanned by the axis of rotation of the ring disk 1 and the segment III-III. In the right part of the figure there is a blind hole 3 into which the wick 4 is inserted. As a result of the orientation of the pores, which in the case of wicks of carbonized wood are preferably aligned in the longitudinal axis of the wicks 4 according to the selected preferred orientation in the production of the wicks 4, and which in the case of wicks 4 containing bundles of carbon fibers according to the above explained preferred orientation of the fiber bundles are likewise arranged preferably parallel to the wick axis, the preferred entry region of the liquid silicon into the ring disk to be infiltrated is formed by the step 33 in the blind hole 3 in the transition from the drilled hole 31 with the larger diameter to the drilled hole 32 with the smaller diameter of the blind hole 3.

Preferably the blind holes 3 are approx. 1.5 mm to approx. 4 mm, especially preferably 1.8 mm to 3 mm, from the surface of the ring disk opposite the drilled hole; its diameter in the region of the drilled hole 32 with the smaller diameter is preferably 2 mm to 4.5 mm and especially preferably 2.5 mm to 4 mm. In the region of the drilled surface the diameter of the drilled hole 31 is preferably at least twice the diameter in the narrower part; favorable values are from 4 mm to 10 mm. The depth of the region of the drilled hole 31 of the blind hole with the larger diameter here is preferably at least 3 mm and preferably not more than 10 mm or 25% of the thickness of the component at this site. The preferred length of the region of the drilled hole 32 with the smaller diameter can be found by calculation from the indicated preferred regions for the depth of the blind hole 3 and the depth of the region of the drilled hole 31.

Appropriate, preferably cylindrical wicks 4, preferably of porous carbon, are inserted into the region of the drilled hole 31 of the blind holes with a larger diameter with little play, preferable from 0.05 mm to 0.2 mm. With little play the insertion of the wicks into the drilled hole 31 is sufficient, in the case of greater play, attachment, for example, by cementing is preferred. Wicks of carbonized wood or porous carbon reinforced with carbon fibers are especially preferred, especially those wicks being preferred which contain roving bundles placed parallel in cylindrical shape, which bundles are bound by carbonizable binders such as phenolic resins or pitches or their mixture, before use these binders having been carbonized by heating with the exclusion of oxygen to temperatures from approx. 750 ° C. to 1300 ° C.

The infiltration agent which is diffusing through the wick 4, preferably silicon or a melt containing it, is distributed in the region of the drilled hole 32 and fills it when the diameters as stated above are observed in this hole; from this reservoir the infiltration agent can diffuse perpendicular to the axis of rotation of the ring disk into the interior of the ring disk and for the preferred orientation of reinforcing fibers in the porous carbon body which preferably forms the ring disk in the plane of the ring disk, that is, perpendicular to the axis of rotation, causes uniform advance of the front of the infiltration agent out of the region of the drilled hole 32.

Figure 4:
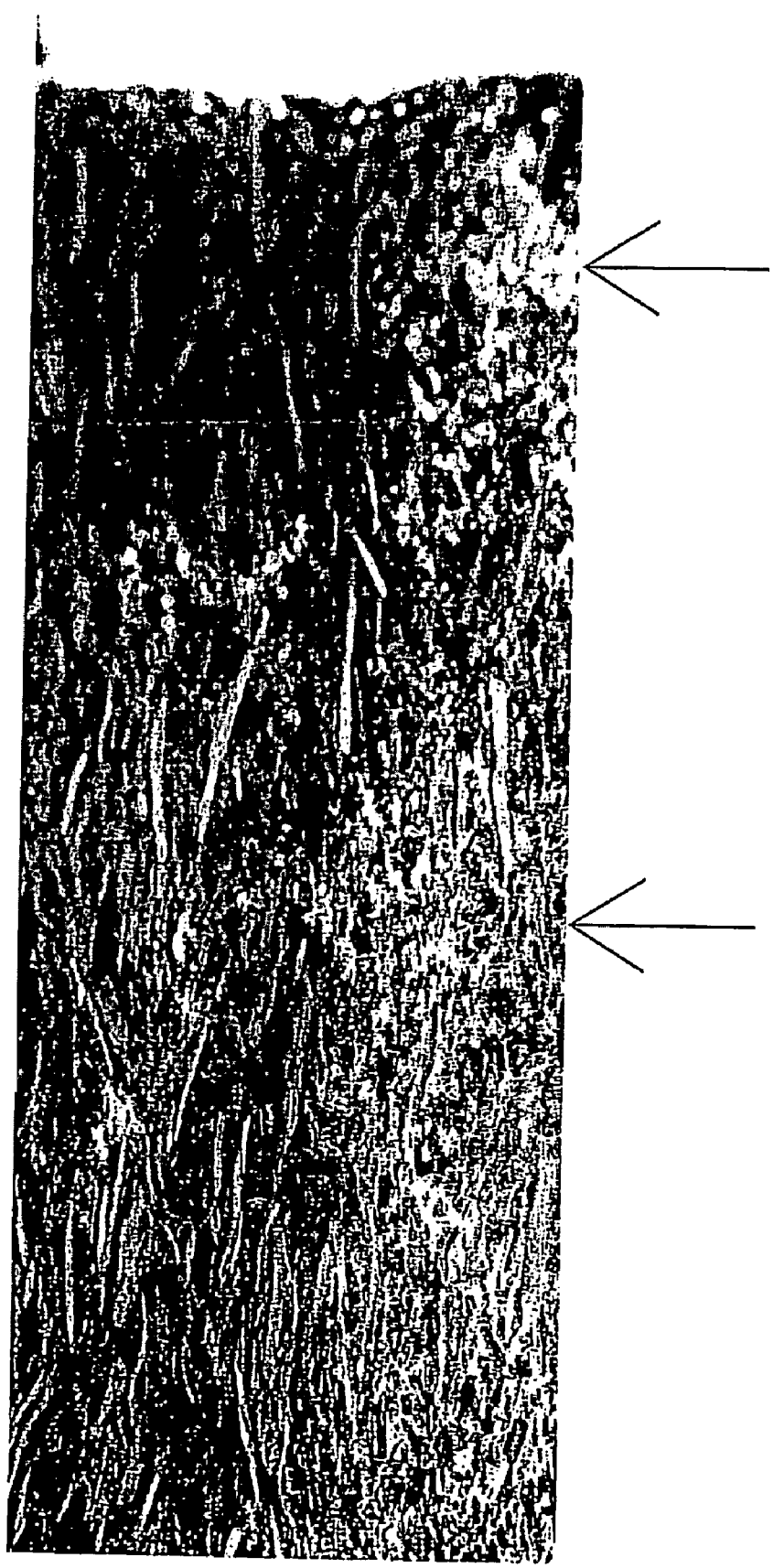
FIG. 4 shows a photograph of a section through a siliconized ring disk, an insufficient amount of silicon having infiltrated from the undersurface by placement on porous wicks, and infiltration having been afterwards interrupted, and the partially siliconized body being sawn off and photographed.
Figure 5:
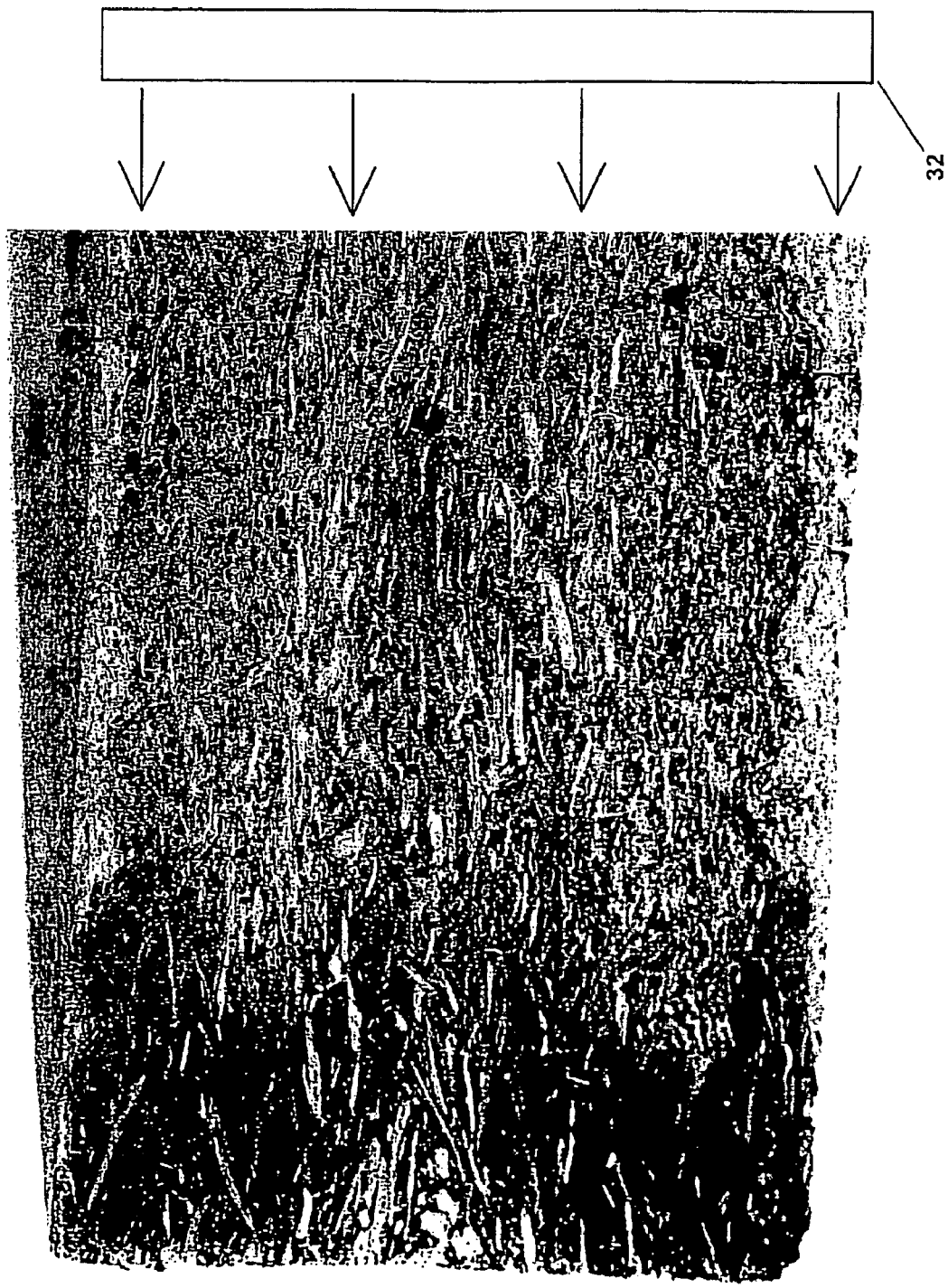
FIG. 5 shows a photograph of a section through a geometrically identical ring disk which has been infiltrated according to the method according to the invention, an insufficient amount of silicon having infiltrated from a blind hole with the porous wick inserted, and infiltration having been interrupted afterwards, and the partially siliconized body being sawn off and photographed.

The advantage of uniform infiltration achieved by the invention is shown by the photographs of FIGS. 4 and 5, in FIG. 4 the supply of liquid silicon at 1500 ° C. and a pressure of 5 hPa having taken place from the bottom of the ring disk in the ground pick by wicks which are not shown here and which have been removed from the ring disk by partial siliconization; the wick locations are marked by arrows. The silicon can be recognized in the photographs in the form of white spots. It can be discerned that diffusion in the direction of the front, that is, from the bottom in the figure to the top, takes place very nonuniformly; diffusion in the horizontal direction is also more rapid than in the vertical direction. The orientation of the reinforcing fibers is horizontal, as can be recognized in the figure; this orientation is due to the required strength of the ring disk.

FIG. 5 shows a sawn ring disk in which the supply of the infiltration agent silicon has taken place from the zone of the drilled hole 32 viewed in the horizontal direction (direction of the arrow) in the figure, the uniform flow front of the silicon in the ring disk provided with reinforcing fibers in the horizontal direction and the silicon carbide imaged gray in the photographs being clearly recognizable. The same amount of silicon (determined by weighing) under otherwise identical conditions was infiltrated into the ring disk with the same geometry as in the example shown in FIG. 4, with infiltration from the undersurface of the ring disk. Infiltration takes place more quickly and more uniformly than in the example shown in FIG. 4.

The invention claimed is:

1. A method of producing a body of diverse materials comprising:
    forming a porous body of a first material;
    forming a plurality of recesses in a surface of said body;
    inserting wicks in said recesses; and
    infusing a second material into the interior of said first material by injecting said second material into and through said wicks, wherein the method further includes enlarging a portion of each of said recesses and inserting said wicks into said enlarged portion of said recesses.

2. The method according to claim 1 wherein said first material includes carbon and said infused second material includes molten silicon which chemically reacts with said carbon to form a carbide.

3. The method according to claim 2 wherein said first material includes a fibrous material.

4. The method according to claim 3 wherein said fibrous material is embedded in a porous matrix of carbon.

5. The method of claim 2 wherein each of said wicks comprises one of carbonized wood and porous carbon reinforced with carbon fibers.

6. The method according to claim 1 wherein said body is annularly configured and said recesses are dispersed on a face of said surface.

7. The method according to claim 1 wherein said recesses extend through a major portion of a thickness of said body.

8. The method according to claim 1 wherein said enlarged portion of said recess extends 25% of the depth of said recess.

9. The method according to claim 1 wherein a diameter of each of said enlarged portions is twice the diameter of each of said recesses.

10. The method of claim 1 wherein the diameter of each of said recesses is in the range of 2 mm to 4.5 mm and the diameter of each of said enlarged portions of said recesses is in the range of 3 mm to 10 mm.

11. The method of claim 1 wherein said body comprises a disk of a brake assembly.

* * * * *